United States Patent
Pacitti et al.

(10) Patent No.: US 7,150,273 B2
(45) Date of Patent: Dec. 19, 2006

(54) EXHAUST MANIFOLD ARRANGEMENT

(75) Inventors: Adriano F. Pacitti, Matsumoto (JP); Chris Barnes, Market Deeping (GB)

(73) Assignee: Perkins Engines Company Limited, Peterborough (GB)

(*) Notice: Subject to any disclaimer, the term of this patent is extended or adjusted under 35 U.S.C. 154(b) by 0 days.

(21) Appl. No.: 11/206,910

(22) Filed: Aug. 19, 2005

(65) Prior Publication Data

US 2006/0037592 A1 Feb. 23, 2006

(30) Foreign Application Priority Data

Aug. 19, 2004 (EP) .................... 04254978

(51) Int. Cl.
*F02B 27/00* (2006.01)
(52) U.S. Cl. .............. 123/568.2; 123/65 PE; 123/65 EM; 60/324
(58) Field of Classification Search ............. 123/399, 123/568.11, 568.14, 568.2, 65 PE, 65 PD, 123/65 V, 65 EM, 65 P, 559.1, 559.2; 60/288, 60/292, 304, 305, 324
See application file for complete search history.

(56) References Cited

U.S. PATENT DOCUMENTS

| | | |
|---|---|---|
| 3,591,959 A | 7/1971 | Kubis |
| 3,726,084 A | 4/1973 | Meier et al. |
| 3,768,248 A | 10/1973 | Grgurich et al. |
| 3,938,330 A | 2/1976 | Nakajima et al. |
| 3,941,113 A | 3/1976 | Baguelin |
| 4,395,884 A | 8/1983 | Price |
| 4,458,491 A | 7/1984 | Deutschmann |
| 4,559,784 A | 12/1985 | Jenny et al. |
| 4,714,056 A | 12/1987 | Tottori et al. |
| 4,732,116 A * | 3/1988 | Tanahashi et al. ...... 123/65 BA |
| 4,732,117 A * | 3/1988 | Tanahashi et al. ...... 123/65 PE |
| 4,732,118 A | 3/1988 | Tanahashi et al. |
| 4,800,720 A | 1/1989 | Okada |
| 4,813,232 A | 3/1989 | Hitomi et al. |
| 5,134,850 A | 8/1992 | Saito et al. |
| 5,406,795 A | 4/1995 | Raub et al. |
| 5,406,918 A | 4/1995 | Joko et al. |
| 5,517,976 A | 5/1996 | Bächle et al. |
| 5,603,292 A | 2/1997 | Håkansson |
| 5,682,746 A | 11/1997 | von Hoerner |
| 5,713,200 A | 2/1998 | Baets et al. |
| 5,740,671 A | 4/1998 | Jones |
| 5,782,226 A | 7/1998 | Gärtner |
| 6,038,860 A | 3/2000 | Bailey |

(Continued)

FOREIGN PATENT DOCUMENTS

CA 952778 8/1974

(Continued)

OTHER PUBLICATIONS

European Search Report dated Apr. 20, 2005, EP 04 25 4978 (2 pages).

*Primary Examiner*—Hai Huynh
(74) *Attorney, Agent, or Firm*—Finnegan,Henderson, Farabow,Garrett&Dunner

(57) ABSTRACT

A passageway is provided between branches of a multi-branch exhaust manifold to reduce the amount of backflow (iEGR) into the cylinders at low engine speeds. The passage is located upstream of the turbocharger and can be at the part of the manifold where the branches merge for entry into the turbo. The passageway allows exhaust pressure pulse modulation so that high iEGR levels (using iEGR through delayed exhaust valve closing for example) are avoided. The passage may be controllable to modulate the effect based on engine conditions.

17 Claims, 5 Drawing Sheets

U.S. PATENT DOCUMENTS

| | | | |
|---|---|---|---|
| 6,089,019 A | 7/2000 | Roby et al. | |
| 6,257,213 B1 | 7/2001 | Maeda | |
| 6,263,672 B1 | 7/2001 | Roby et al. | |
| 6,308,666 B1 * | 10/2001 | Drecq | 123/58.8 |
| 6,325,043 B1 | 12/2001 | Meistrick et al. | |
| 6,439,211 B1 | 8/2002 | Juretzka et al. | |
| 6,662,554 B1 | 12/2003 | Sheidler et al. | |
| 6,675,572 B1 * | 1/2004 | Everingham et al. | 60/278 |
| 6,772,588 B1 * | 8/2004 | Yamada et al. | 60/313 |
| 6,923,149 B1 * | 8/2005 | Nishimoto et al. | 123/58.8 |
| 6,932,062 B1 * | 8/2005 | Kuzuyama et al. | 123/568.13 |
| 6,932,063 B1 * | 8/2005 | Hu | 123/568.14 |
| 6,941,905 B1 * | 9/2005 | Hitomi et al. | 123/58.8 |
| 2003/0196646 A1 | 10/2003 | Shoyama et al. | |

FOREIGN PATENT DOCUMENTS

| | | |
|---|---|---|
| CA | 969827 | 6/1975 |
| CH | 530 554 | 12/1972 |
| CH | 360 704 | 10/1973 |
| DE | 2 125 368 | 12/1971 |
| EP | 1 406 002 A1 | 4/2004 |
| GB | 2 121 875 A | 1/1984 |
| GB | 2 253 881 A | 5/1991 |
| JP | 5113024 | 10/1976 |
| JP | 61205331 A | 9/1986 |
| JP | 01024118 A | 1/1989 |
| JP | 06074038 A | 3/1994 |
| JP | 10089033 A | 4/1998 |
| JP | 10169513 | 6/1998 |
| JP | 11093715 A | 4/1999 |
| WO | WO 91/07577 | 5/1991 |

* cited by examiner

EXHAUST MANIFOLD ARRANGEMENT

TECHNICAL FIELD

The disclosure relates to the field of internal combustion engines and more specifically to internal exhaust gas recirculation within such engines.

BACKGROUND

The use of internal exhaust gas recirculation (iEGR) is a known method for reducing the amount of pollutants in the exhaust gasses of internal combustion engines. iEGR can be achieved by either introducing exhaust gas into the induction manifold or by allowing exhaust gas to flow back from the exhaust manifold into the combustion chamber during the induction stroke. DE2125368 teaches the principle of an internal exhaust gas recirculation arrangement in which exhaust gas is fed back to the combustion chamber during the intake stroke. However, problems due to exhaust gas pressure pulsations within the exhaust manifold have led to unsatisfactory results in emission control strategies. The present disclosure is aimed at overcoming one or more of the problems as described.

SUMMARY OF THE INVENTION

In a first embodiment there is provided an internal combustion engine with a plurality of cylinders, each of the cylinders having a corresponding exhaust valve and the cylinders are divided into at least a first set and a second set. It furthermore includes an exhaust manifold, the exhaust manifold further having at least a first branch in direct fluid communication with the cylinders in the first cylinder set and a second branch being in direct fluid communication with the cylinders in the second cylinder set when the corresponding exhaust valves are in an open position.

There is also an internal exhaust gas recirculation arrangement, allowing at least part of the exhaust gas to flow from the exhaust manifold into the cylinders during at least part of an intake stroke of said cylinders, and a passage located in or proximal to the exhaust manifold for fluidly connecting the first branch and the second branch adapted to reduce the flow of exhaust gas from the exhaust manifold into the cylinders.

In a second embodiment there is provided a turbocharger for a multi-cylinder internal combustion engine. The internal combustion engine has a plurality of cylinders, each of the cylinders having a corresponding exhaust valve, and the cylinders are divided into sets. It further includes an exhaust manifold having at least two branches, each of the branches is in direct fluid connection with the cylinders in one of the cylinder sets when the corresponding exhaust valves are in an open position. There is also an internal exhaust gas recirculation arrangement, allowing at least part of the exhaust gasses to flow back from the exhaust manifold into the cylinders during an intake stroke of the cylinders. The turbocharger has an exhaust gas inlet, at least part of the exhaust gas inlet is adapted to maintain the gas flow separation from the cylinder sets, and a passage adapted to fluidly connect at least the at least two branches to reduce the back flow of exhaust gasses from the exhaust manifold into the cylinders. The passage is located in the exhaust gas inlet of the turbocharger.

DETAILED DESCRIPTION

Figure 1:
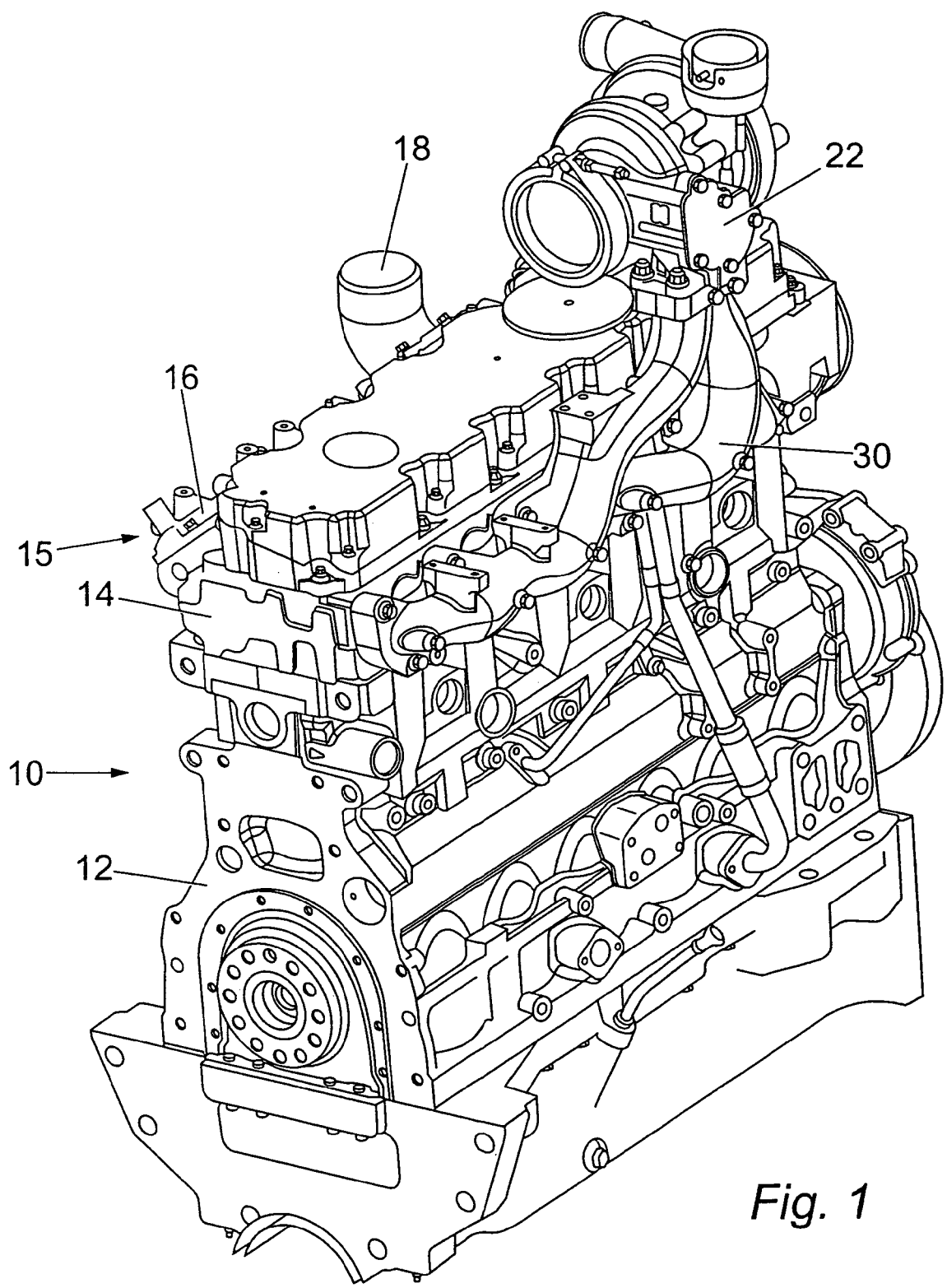
FIG. 1 is a partial schematic isometric view of an internal combustion engine according to the present disclosure.
Figure 2:
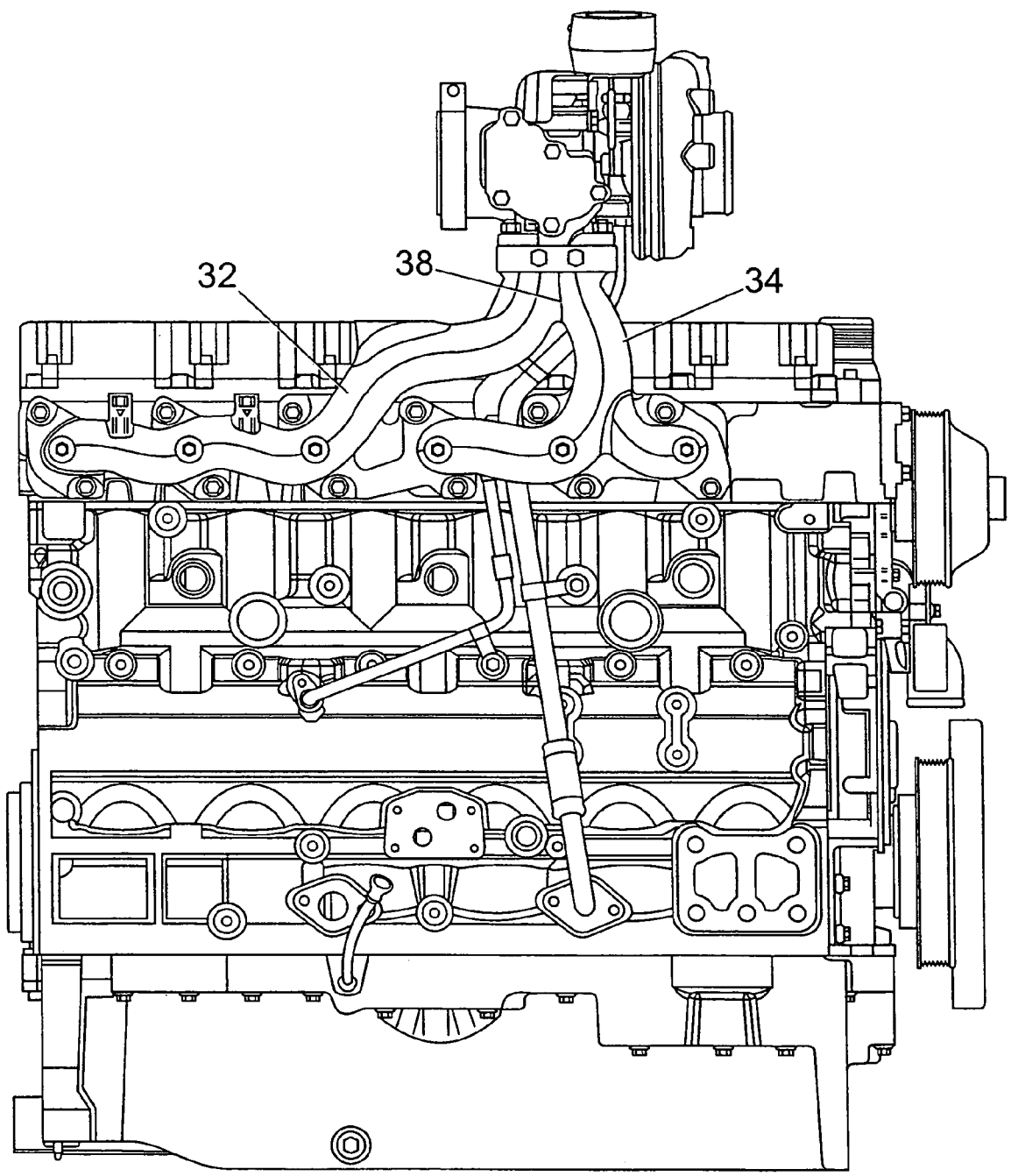
FIG. 2 is a partial schematic RHS view of the same engine as shown in FIG. 1.

FIGS. 1 and 2 show an internal combustion engine 10. The engine 10 is shown as a six cylinder in-line, turbocharged, compression ignition engine, but this is for illustrative purposes only. The principle of the disclosure applies to engines with more or less cylinders, to engines configured differently such as V-style engines, to naturally aspirated engines and to spark ignited engines.

The engine 10 has a plurality of cylinders 11 (FIG. 6), a cylinder block 12 and a cylinder head 14, assembled together with a sealing arrangement in between (not shown). Connected to the cylinder head is an induction arrangement 15, in this example shown as an induction manifold 16 with an induction pipe 18 for supplying the engine with air for the combustion process. Also connected to the cylinder head, but in this example at the opposite side of the induction arrangement, is an exhaust manifold 30 and connected thereto a turbocharger 22. For clarity purposes not all connections to and from the turbocharger are shown, but they are mostly conventional.

Figure 3:
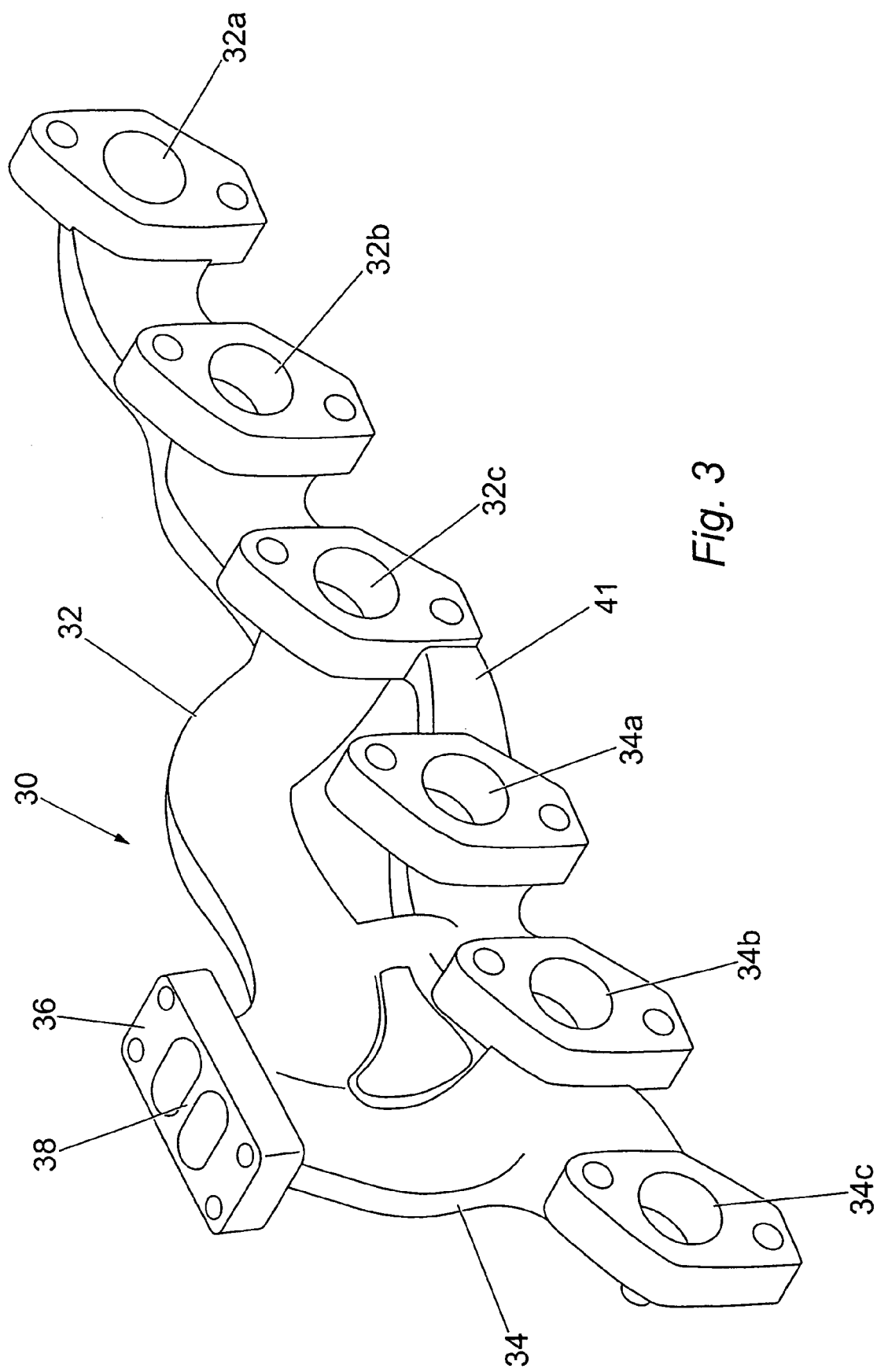
FIG. 3 is a schematic isometric view of an exhaust manifold according to the present disclosure.
Figure 4:
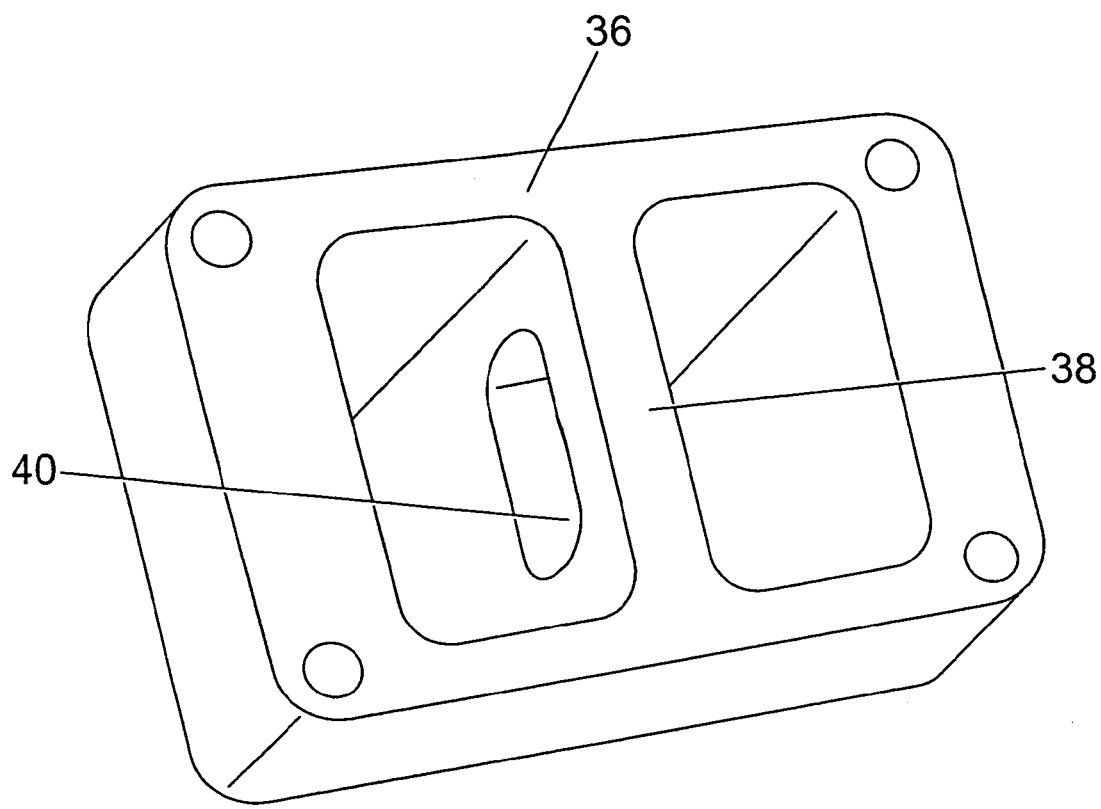
FIG. 4 is a representation of a passage within an exhaust manifold such as that shown in FIG. 3.

The exhaust manifold 30 as shown in detail in FIG. 3 is a possible variant of the one shown in FIGS. 1 and 2, but the principle is the same and identical indices are used where appropriate. The exhaust manifold is a multi-branch manifold, in this case two branches are present, a first branch 32 and a second branch 34. Each branch has three ports 32a–c, 34a–c, each port 32a–c, 34a–c corresponding to a single cylinder of the engine 10. Each branch is therefore connected to three cylinders thereby artificially dividing the engine in two sections of three cylinders. The three cylinders in a group are likely to be adjacent to each other, but that may be varied if deemed appropriate. The two branches may have supporting bridge pieces such as 41, in between them that do not provide fluid communication between the two branches. At the downstream end of the exhaust manifold 30 there is a flange 36 to allow a connection to the turbocharger 22. Even though the branches may share a common wall 38, they do not allow any mixing of the gas flows except via a passage 40 which in this example is located in the common wall as shown in FIG. 4. Alternatively the passage may also be a connection between the two branches upstream of the common wall 38, for example by an external pipe (not shown). Yet another alternative is where the inlet of the turbocharger is substantially a mirror image of the corresponding counterparts of the exhaust manifold, namely the flange and the common wall. The inlet section of the turbocharger therefore appears to be an extension of the exhaust manifold. In that case the passage may be located in that part of the turbocharger that appears to extend the common wall of the exhaust manifold.

Systems that maintain separate gas flows as described are common where the turbocharger 22 operates via a pulse wave method. This method relies on a compact flow of gas to ensure a quick responsive behavior of the turbocharger, the quick response relying on a separation of the various gas flows from the cylinder groups until proximal to the turbine of the turbocharger.

Figure 5:
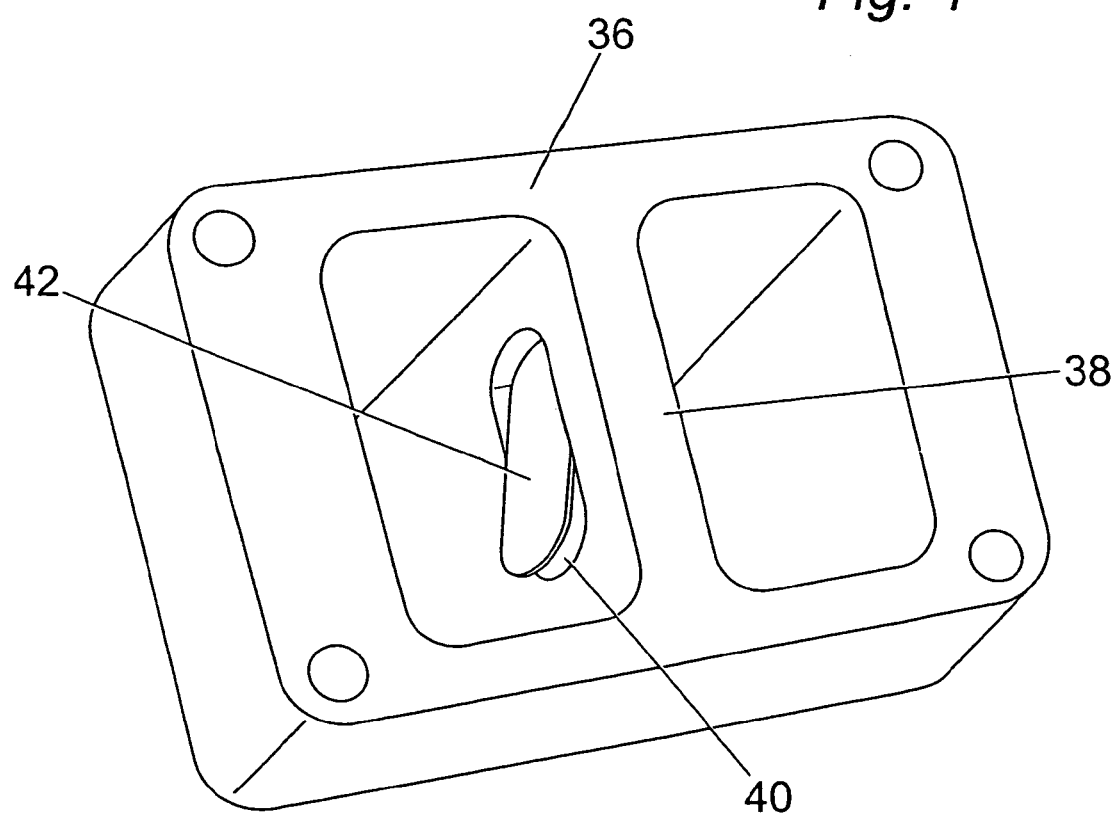
FIG. 5 is a schematic representation of a passage similar to that shown in FIG. 4, but with an additional valve.

The sectional area of passage 40 may be controllable by a valve 42 as shown in FIG. 5. The valve is a simplistic representation of a butterfly valve, but any other suitable valve such as a sliding valve or an iris type valve may be used. The valve may be operated and/or controlled mechanically, electronically, hydraulically or pneumatically. Examples may be a pressure sensor in combination with an electronic control unit and electric motor, or an exhaust gas pressure actuated membrane directly connected with the valve via mechanical means.

Figure 6:
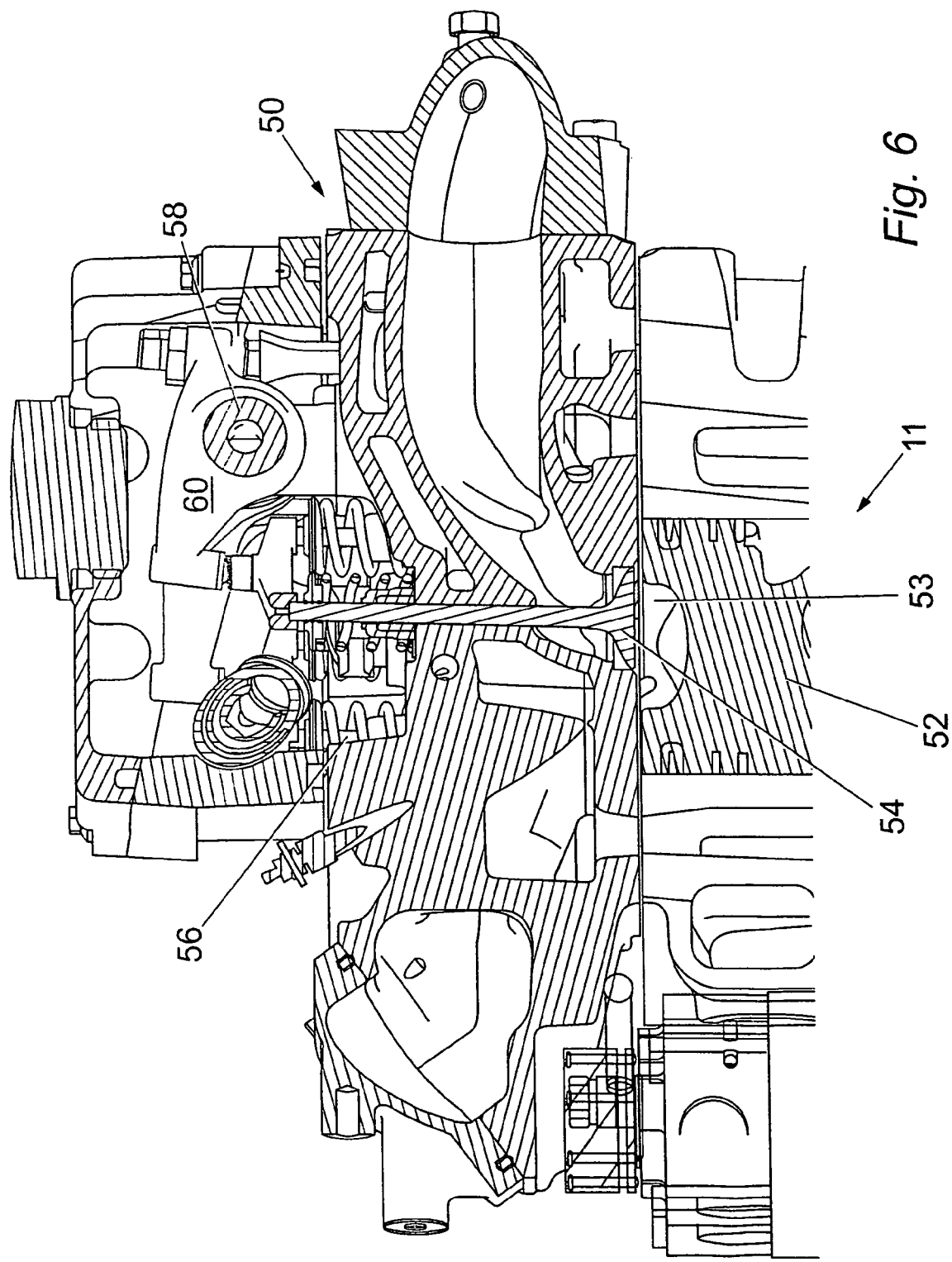
FIG. 6 is a schematic cross-sectional view of a combustion chamber and the porting arrangement of an internal combustion engines such as shown in FIGS. 1 and 2.

One of the cylinders 11 of the engine 10 is partially shown in FIG. 6. The piston 52, the combustion chamber 53, the intake valve 56 and the exhaust valve 54 are conventional, and there may be more than just one intake valve and/or exhaust valve per cylinder. The opening and closing of the exhaust valve and the intake valve follow a fixed timing pattern relative to the angle of the crankshaft (not shown) but may also be controlled by a variable valve timing arrangement. The valves can be actuated by any suitable means such as a camshaft 58 and rocker arm 60, or via hydraulic or electronic arrangements (not shown).

INDUSTRIAL APPLICABILITY

The internal combustion engine 10 uses the principle of iEGR via an iEGR arrangement 50 to improve emissions performance over a standard combustion process. iEGR can be achieved by either opening the intake valve 56 during the exhaust stroke of the piston 52 or by opening the exhaust valve 54 during the induction stroke of the piston. The principle used for this disclosure is the latter whereby during the induction stroke of the piston 52 part of the previously expelled exhaust gas is sucked back from the exhaust manifold 30 into the combustion chamber 53.

In conventional combustion cycles the exhaust valve 54 is opened mainly during the period wherein the piston 52 is performing its exhaust stroke. The period that the exhaust valve 54 is opened may not be identical to the period in which the piston is in the exhaust stroke, the valve opening period may be either shorter or longer, but is usually not much longer than the period of the exhaust stroke. Hence no, or an insignificant amount of, exhaust gas is sucked back into the combustion chamber 53.

In this particular iEGR system the exhaust valve 54 is open during at least part of the piston's 52 downward inlet stroke, so there is a substantial overlap in the periods that both the inlet 56 and exhaust valves are at least partially open. However, when the piston is approaching its top dead center (TDC) position, i.e., the end of the upward exhaust stroke, valve lifts must be reduced. One of the reasons for reducing valve lift is that if the exhaust valve is not recessed deeply into the cylinder head 14, the clearance between the piston at TDC and the exhaust valve may not be sufficient to avoid interference. The exhaust valve may even have to be closed completely to avoid clashing with the piston. In that case, the exhaust valve is reopened after the piston has passed its TDC position to allow at least some of the previously expulsed exhaust gas to flow back into the combustion chamber 53 when the piston continues its downward induction stroke.

Another variant uses a design that allows enough clearance between a partially opened exhaust valve 54 and the piston 52 at TDC, for example where the exhaust valve is recessed deeply into the cylinder head 14. The exhaust valve therefore does not have to be closed completely and so rather than reopening the exhaust valve, the exhaust valve follows a delayed closure pattern. The non-closure of the exhaust valve during the TDC position of the piston has the added benefit of gaining a better advantage of the pumping effect of the piston.

In addition to the various valve events and iEGR for controlling combustion, injection events are also crucial. Whereas traditionally one injection took place per cycle, nowadays it is common to have multiple injection events per cycle, e.g. split injections or pilot, pre- or post-injections in addition to a main injection. All these events influence the amount of exhaust gasses released at certain periods during a combustion cycle. Exhaust manifolds such as manifold 30 are designed to accommodate these exhaust gas pulses in a controllable manner so that the pulses do not interfere negatively with each other. However, interference problems may occur at several points in the speed range of an engine 10 as the manifold shape is a compromise to give an overall acceptable result across the operating range of the engine. A manifold with multiple branches that do not allow any fluid communication improves the pulsating action upon the turbine of the turbocharger and therefore the functioning of the turbocharger, but has the disadvantage that exhaust gas pressure pulses may cause the iEGR levels to be too high.

For example, emissions legislation may regulate the maximum level of emissions over certain engine speeds, e.g., 1400 rpm. With two manifold branches that do not allow any fluid communication until proximal to the turbocharger, iEGR is required above 1400 rpm to meet the emissions regulation. Even though control systems such as waste gates are available to improve turbocharger efficiency throughout the speed range, the efficiency is still likely to vary. Especially at low speeds the turbocharger is less likely to easily supply a sufficient quantity of combustible air for an optimized combustion process. If exhaust gasses would flow back into the combustion chamber, the combustion process would be even less optimal and problems such as power loss and visible smoke may occur. Therefore it would in this example be very beneficial to be able to reduce the amount iEGR at low engine speeds.

A passage such as passage 40 allows a control of the amount of iEGR by reducing exhaust gas pressure pulses via a pressure relief. Due to the nature of combustion cycles and the firing orders employed, the branches 32, 34 of the manifold 30 are out of synchronization with regards to pressure and pressure pulses.

This translates into a flux situation wherein the branches alternate in low and high pressures without being equal except at crossover points where the pressure simultaneously rises in one branch whilst falling in the other branch. The different pressures allow some gas to flow from the branch with the higher gas pressure to the branch with the lower gas pressure. Therefore the pressure peaks are absorbed which then obviously leads to less iEGR if the exhaust valve is open during the intake stroke.

If the passage is not variable or controllable, the passage is sized such that at all engine speeds the pressure relief from the first branch into the second branch and vice versa is performing to an overall acceptable level. However, more emphasis may be given to overcome a problem in a particular speed range such as the problem associated with low speed situations. If the passage is controllable it is likely that, to overcome the problems as indicated, the passage will be at a high degree of, or even maximum, opening at low engine speeds whilst it may be at a lower degree of, or minimum, opening at high engine speeds.

Of course, it is to be understood that engines, subsystems, and especially manifolds with different characteristics combined with different operational demands may dictate different passage control regime.

Although the preferred embodiments of this invention have been described herein, improvements and modifications may be incorporated without departing from the scope of the following claims.

What is claimed is:

1. An internal combustion engine comprising;
   a plurality of cylinders, each of said cylinders having a corresponding exhaust valve, said cylinders being divided into at least a first set and a second set;
   an exhaust manifold, said exhaust manifold further having at least a first branch and a second branch, said first branch being in direct fluid communication with said cylinders in said first cylinder set and said second branch being in direct fluid communication with said cylinders in said second cylinder set when said corresponding exhaust valves are in an open position;
   an internal exhaust gas recirculation arrangement, allowing at least part of the exhaust gas to flow from said exhaust manifold into said cylinders during at least part of an intake stroke of said cylinders;
   a turbocharger connected to said exhaust manifold; and
   a passage located in or proximal to said exhaust manifold and proximate to said turbocharger for fluidly connecting said first branch and said second branch to reduce the flow of exhaust gas from said exhaust manifold into said cylinders.

2. An internal combustion engine according to claim 1, wherein the sectional area of said passage is controllable.

3. An internal combustion engine according to claim 1, wherein said exhaust valve is cam actuated.

4. An internal combustion engine according to claim 1, wherein said exhaust valve is actuated by hydraulic, pneumatic or electric actuators.

5. An internal combustion engine according to claim 1, wherein said engine is a six cylinder in-line engine.

6. An internal combustion engine according to claim 1, wherein said manifold has two branches and each of said two branches has a direct fluid connection to three of said plurality of cylinders when said corresponding exhaust valves are in an open position.

7. An internal combustion engine according claim 1, wherein said first branch and said second branch share a common wall and said passage is located in said common wall.

8. An internal combustion engine according to claim 1, wherein at least part of an exhaust gas inlet of said turbocharger maintains a gas flow separation from said cylinder sets.

9. An internal combustion engine according to claim 1, wherein said internal combustion engine is a compression ignition engine.

10. An internal combustion engine according to claim 1, wherein each of said cylinders further has a corresponding inlet valve, and there is a significant overlap of the periods in which said exhaust valve and said inlet valve are at least partially open.

11. An internal combustion engine according to claim 1, wherein a cylinder receives multiple fuel injections per cycle.

12. A method of operating an internal combustion engine having a turbocharger, wherein the engine includes:
    a plurality of cylinders, each of said cylinders having a corresponding exhaust valve, said cylinders being divided into at least a first cylinder set and a second cylinder set,
    an exhaust manifold, said exhaust manifold further having at least a first branch and a second branch, said first branch being in direct fluid communication with said cylinders in said first cylinder set and said second branch being in direct fluid communication with said cylinders in said second cylinder set when said corresponding exhaust valves are in an open position, the method comprising:
    allowing at least part of the exhaust gas to flow from said exhaust manifold into said cylinders during at least part of an intake stroke of said cylinders; and
    reducing the flow of exhaust gas from said exhaust manifold into said cylinders by fluidly connecting said first branch and said second branch by means of a passage located in said exhaust manifold proximate to said turbocharger.

13. A method according to claim 12, comprising the step of controlling the sectional area of said passage.

14. A method according to claim 12, wherein the sectional area of said passage is controlled during operation of the engine such that the sectional area of said passage is less than maximal during lower engine speeds.

15. A method according to claim 12, wherein the closing of said exhaust valve is delayed.

16. A method according to claim 12, wherein said exhaust valve travels towards a lower end of said internal combustion engine more than once per combustion cycle.

17. A turbocharger and multi-cylinder internal combustion engine combination, comprising:
    a plurality of cylinders, each of said cylinders having a corresponding exhaust valve, said cylinders being divided into sets;
    an exhaust manifold having at least two branches, each of said branches being in direct fluid connection with said cylinders in one of said cylinder sets when said corresponding exhaust valves are in an open position;
    an internal exhaust gas recirculation arrangement, allowing at least part of the exhaust gasses to flow back from said exhaust manifold into said cylinders during an intake stroke of said cylinders;
    an exhaust gas inlet for said turbocharger, at least part of said exhaust gas inlet being adapted to maintain the gas flow separation from said cylinder sets; and
    a passage adapted to fluidly connect at least said at least two branches to reduce the back flow of exhaust gasses from said exhaust manifold into said cylinders, said passage being located in said exhaust gas inlet of said turbocharger.

* * * * *